Nov. 23, 1971 L. V. OTTINGER 3,621,615
APPARATUS AND METHOD FOR THE MANUFACTURE OF A TEXTURED PANEL
Filed Nov. 26, 1969 2 Sheets-Sheet 1
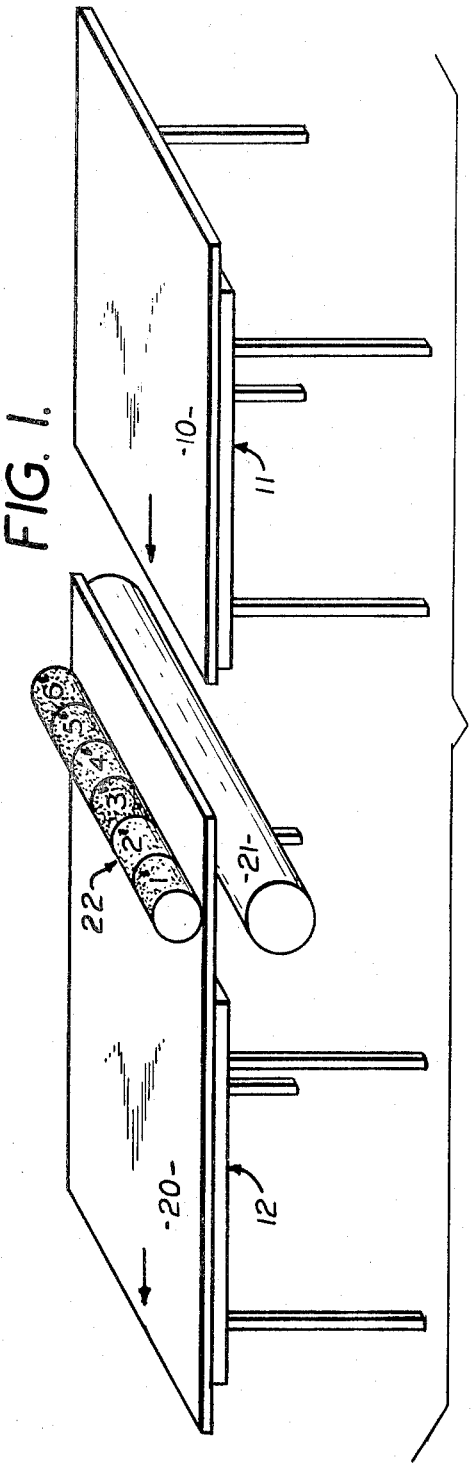
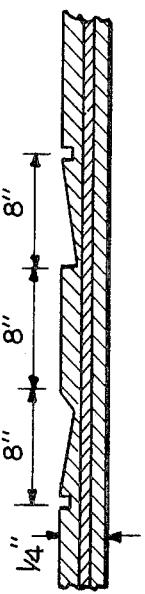
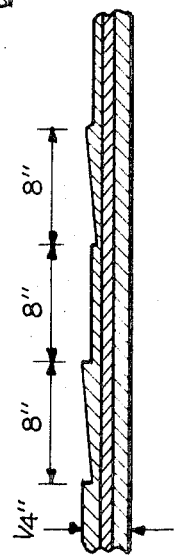
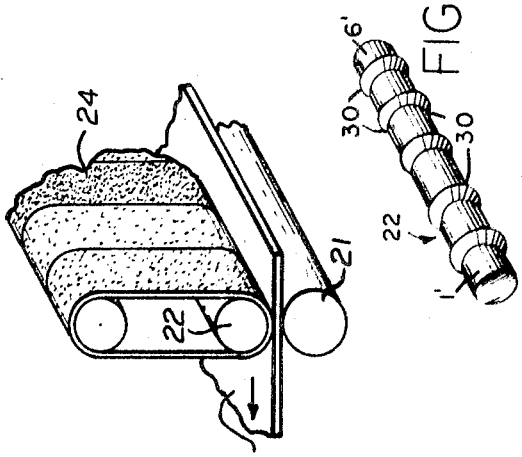
INVENTOR
LESTER V. OTTINGER
BY James M. Heilman
ATTORNEY.

Nov. 23, 1971  L. V. OTTINGER  3,621,615
APPARATUS AND METHOD FOR THE MANUFACTURE OF A TEXTURED PANEL
Filed Nov. 26, 1969  2 Sheets-Sheet 2

INVENTOR
LESTER V. OTTINGER
BY *James M. Heilman*
ATTORNEY.

United States Patent Office 3,621,615
Patented Nov. 23, 1971

3,621,615
**APPARATUS AND METHOD FOR THE MANU-
FACTURE OF A TEXTURED PANEL**
Lester V. Ottinger, Danbury, Conn., assignor to U.S.
Plywood-Champion Papers Inc., New York, N.Y.
Filed Nov. 26, 1969, Ser. No. 880,340
Int. Cl. B24b 1/00
U.S. Cl. 51—5                                         3 Claims

ABSTRACT OF THE DISCLOSURE

Textured panel and apparatus and method for manufacturing the same which comprises a fibrous board such as lumber, plywood, hardboard, particle board, etc. which has been operated on by one or a plurality of scoring sleeves or scoring cylinders in order to produce a decorative structural element appearing to have a plurality of parallel sections with a weathered barnboard appearance.

---

Apparatus and method for manufacturing a textured panel which comprises a fibrous board such as lumber, plywood, hardboard, particle board, etc. which has been operated on by one or a plurality of scoring sleeves or scoring cylinders in order to produce a decorative structural element appearing to have a plurality of parallel sections with a weathered barnboard appearance.

The present invention is concerned principally with a technique and apparatus for producing a unique building element and/or surfacing panel. While plywood panel is mentioned throughout, it is understood that the invention is applicable to any fibrous building material such as hardboard, lumber, particle board, and the like. Specifically, the invention is concerned with the surfacing or texturing of panels or boards that will increase their ability to expand and contract with moisture content changes and improve their aesthetic look, and thus have greater acceptance and usage in the building, furniture and related industries.

Panels and boards have been used intensively in the building industry both for exterior and interior use. In order to increase their acceptance and greater use various techniques have been used for improving their aesthetic appearance in order to overcome the smooth and monotonous appearance. For example, plywood panels have been stained by various techniques and also have been grooved to produce the appearance of a plurality of structural abutting boards. Thus, the present invention is concerned with the treatment of relatively flat panels, preferably plywood panels, in a manner to produce a very beautiful appearance and simulate a plurality of boards rather than a large, flat, uninteresting surface.

Since the drawings fail to adequately show the dramatic effect produced by aplicant's invention, a sample of the actual processed material is presented as Exhibit 4. See also applicant's copending design application No. D-22,727, filed Apr. 30, 1970, which is incorporated herein by reference. A print of the physical exhibits filed therein is also attached hereto to Exhibit 5.

The present apparatus and process produce an aesthetic product by machining or surface grooving a plurality of parallel areas of the surface of the panel. These machined parallel areas are of different and unique textures. A preferred technique is to use, for example, six 8" wide abutting machine elements to give the illusion of six different boards when the product panel having a width of 48" is finished. A preferred product having a weathered or barnwood appearance is a 4' x 8' x ¼" thick, three ply, white fir or Douglas fir prefinished panel for interior or exterior use which has been processed as described. The textured panel authentically simulates weather beaten or barnlike lumber, having the correct balance of being rustic and still maintaining the prefinished feeling as required in interior or exterior paneling products. The equipment used to produce this unique panel is a conventional texturing machine preferably using a plurality of modified tungsten carbide abutting abrasive sleeves suitably supported on a back-up pressure roll.

Suitable conventional machines are described in U.S. Pat. No. 2,467,194 issued Apr. 12, 1949 to C.M. De Witt entitled, "Machine for Removing the Soft Wood From the Surface of Plywood Panels," and U.S. Pat. No. 2,720,061 issued Oct. 11, 1955 to E. L. Anderson entitled, "Contact Roll for Abrasive Belt Polishing Machines." These basic machines are, of course, modified in accordance with the present invention to have at least two texturing sleeves or solid elements on the pressure rolls.

In accordance with the preferred adaptation of the present invention, the panel is textured parallel to the grain orientation preferably using six 8" wide abutting sleeves or solid units wherein a plurality of textured area patterns are machined into the panel. The textured variations are made with texturing sleeves or grits using several variables and interrelating the same, such as the depth of the cut, the geometric configuration of the cuts, the drum speed of the texturing cylinder and the feed speed of the panel through the texturing machine.

It is also within the concept of the present invention to vary the texture within the plank width to create the illusion of a slanted or inclined board within a flat panel. It is also within the concept of the present invention, in order to improve the design aspect and to aid the overall aesthetic feel of the rusticness of the product, to change the groove width within the panel. Thus, several groove widths across the panel may be used to simulate the randomness of an old plank lumber installation. A slight groove alteration aids tremendously to the illusion of weatherbeaten lumber. A preferred adaptation of the present invention is to impart the groove with the texturing sleeves and thus eliminate a post grooving step.

The apparatus of the present invention may be readily understood by reference to the drawings illustrating embodiments of the same.

FIG. 1 is a diagrammatical sketch illustrating a drum type apparatus used to produce the textured panel showing specifically the different abutting grits.

FIG. 1A illustrates an adaptation using cloth or paper backed abrasives, elongated so as to be air cooled while traveling to and from an idler roll.

FIG. 1B is a modified form of FIG. 1 showing grooving elements 30 between certain scoring elements.

FIG. 2 is a top view of a textured panel, while

FIG. 3 and FIG. 4 are enlarged end views showing typical profiles of the finished product.

Figure 2:
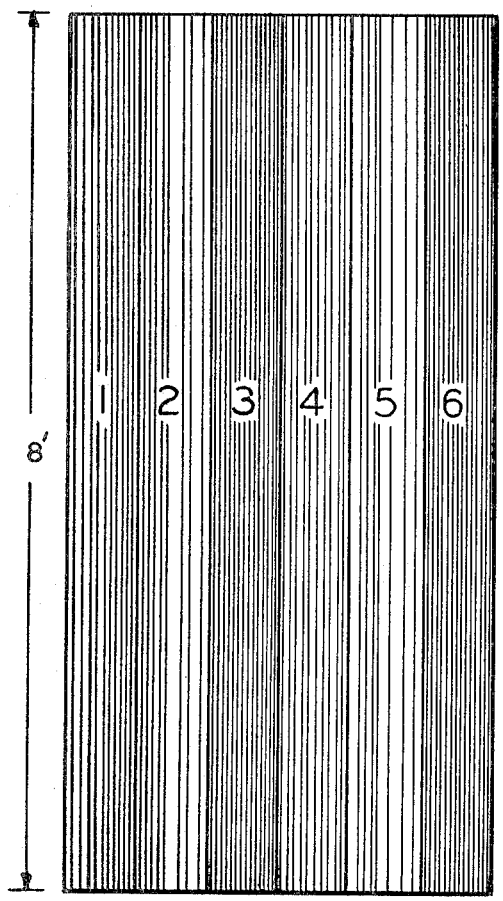

Referring specifically to FIG. 1, panel 10 has been processed and is supported by table 11. Panel 20 is passing between support roll 21 and texturing roll 22. It is to be understood that conventional means may be utilized to support and drive rollers 21 and 22. Incoming panel 20 is supported by supporting apparatus or table 12. The apparatus of the present invention is unique in that texturing roller 22 comprises a plurality of abutting texturing units 1', 2', 3', 4', 5,' and 6'. These texturing units may be sleeves which are abutted up against one another suitably supported or may be solid elements suitably mounted and driven or may comprise texturing papers mounted on a supporting roll. If texturing papers or abrasive belts are used, they may be passed over a conventional top roller to avoid undue heating. While it is preferred that the panel have a width of 48" and that each of these texturing elements have a width of 8", it is to be understood that other modifications may be adapted. The widths may vary fromabout 2" to 24". A very desir-arrangementi s to have varying widths such as: roll one—8" width, roll two—4", roll three—6", roll four—8", roll five—5", roll six—7", roll seven—4", roll eight—2" and roll nine—4" for a total width of 48". Thus the number of rolls may be varied from about two to eight to ten or more and their width adjusted preferably to have a total width of 48" so as to be able to process a 4' x 8' plywood panel.

FIG. 1A illustrates an adaptation using an abrasive cloth or abrasive paper 24 supported on roll 22 to process panel 20.

FIG. 2 is a top view of a panel showing the different types of areas 1, 2, 3, 4, 5, and 6 which are textured.

Figure 2A:
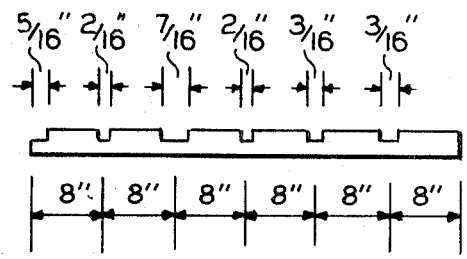
FIG. 2A is an end view thereof.

FIG. 2A is an end view of the panel illustrating different widths of longitudinal grooves between the textured areas.

FIGS. 3 and 4 are end views of the panel which show different and various adaptations of the grooving to produce weathered and unique face appearances.

While the grit specifications may be varied appreciably, typical panel grit specifications are as follows:[1]

PLANK NO. 1

No. 24 grit, sparse all over
No. 16 grit, 6 or 7 pieces—uniformly across
No. 8 grit, 4 or 5 pieces—uniformly across

PLANK NO. 2

No. 46 grit, sparse all over
No. 16 grit, 3 pieces, close together—left ½ two pieces, spread out—right ½
No. 8 grit, 2 pieces, spread out left ½

PLANK NO. 3

No. 10 grit, sparse all over
No. 8 grit, 12 to 15 pieces—randomly across

PLANK NO. 4

No. 16 grit, sparse all over
No. 10 grit, 8 pieces—randomly across
No. 8 grit, 3 pieces—randomly across

PLANK NO. 5

No. 16 grit, 3 pieces on left ½ of plank 5 pieces on right ½ of plank
No. 10 grit, 3 pieces—randomly across PLANK No. 6

No. 10 grit, sparse all over
No. 8 grit, 15 to 20 pieces—randomly

The design versatility of the process can be increased (especially on molded panels such as hardboard) by a second texturing pass made at an angle to the first (e.g.,

[1] Specification—Coated Abrasives Modern Tool of Industry," by Coated Abrasives Manufacturers Institute, published by McGraw-Hill, 1958, pp. 14–15.

90°). This will give a thatched or carved look depending on the depth of cut of each pass as well as the respective angle involved. This second pass can also be through a second set of sleeves of a different design from the first thereby again increasing the design versatility of the process. FIGS. 5A through 5C, and 5F illustrate the various textured surfaces which are attained by a second pass at various angles.

Figure 5:
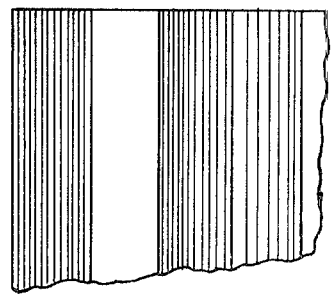
FIG. 5 through FIG. 5F are additional views illustrating the various textured surfaces and indentations.
Figure 5A:
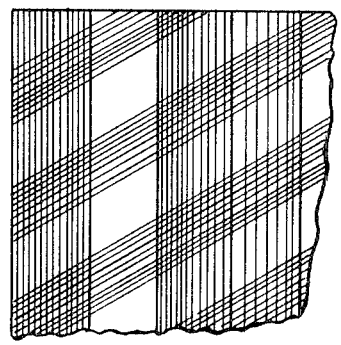

FIG. 5 shows a panel with three panelled textured surfaces and one smooth untextured surface. FIG. 5A is an adaptation of the panel of FIG. 5 where the panel is processed in a second texturing pass using diagonal panelled surfaces superimposed on the initial surfaces.

Figure 5B:
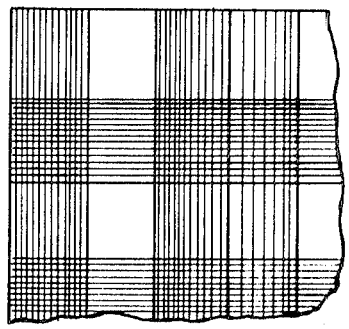
Figure 5C:
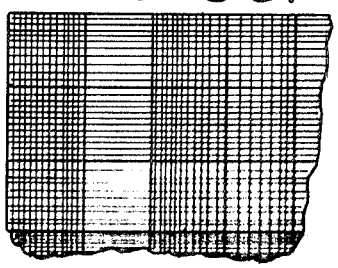
Figure 5F:
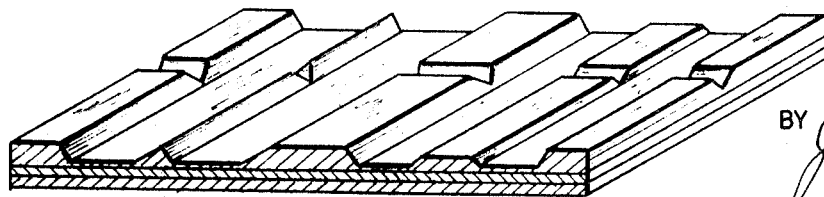

The panel of FIG. 5B is similar to the panel of 5A except the superimposed surfaces are at 90°. FIG. 5C is a further adaptation wherein the superimposed surfacing is a plurality of indentations. FIGS. 5D and 5E are across sections of two separate textures imparted by two different texturing sleeves. FIG. 5F is a perspective of the face of a panel when both textures 5D and 5E are imparted to the panel but at 90° to one another. This allows a non-linear pattern to be made from a continuous linear machining operation.

The embodiments of the invention in which an exclusive property or privilege is claimed as defined as follows:

1. Apparatus for implanting various designs on various areas on a flat surface which comprises a scoring roller characterized in that the scoring roller of said machine has abutting scoring elements of various and different configurations, and wherein said scoring elements are six in number each having a width of approximately 8", and wherein said flat surface is a panel and wherein grooving elements are positioned between scoring elements.

2. Method of implanting various designs on a flat panel which comprises scoring one surface of said panel with a plurality of laterally positioned adjacent scoring elements each of which is of different design in a single first operation, and wherein the panel is scored by rotating element having its axis of rotation at right angles to the movement of the panel, and wherein said scoring elements are sanding belts having different scoring characteristics.

3. Apparatus for implanting various designs on various areas on a flat surface which comprises a scoring roller characterized in that the scoring roller of said machine has abutting scoring elements of various and different configurations, and wherein said scoring elements are six in number each having a width of approximately 8", and having the following approximate characteristics:

Scoring element No. 1:
    No. 24 grit, sparse all over
    No. 16 grit, 6 or 7 pieces—uniformly across
    No. 8 grit, 4 or 5 pieces—uniformly across
Scoring element No. 2:
    No. 46 grit, sparse all over
    No. 16 grit, 3 pieces, close together—left ½. Two pieces spread out—right ½.
    No. 8 grit, 2 pieces, spread out—left ½
Scoring element No. 3:
    No. 10 grit, sparse all over
    No. 8 grit, 12 to 15 pieces—randomly across
Socring element No. 4:
    No. 16 grit, sparse all over
    No. 10 grit, 8 pieces—randomly across
    No. 8 grit, 3 pieces—randomly across
Scoring element No. 5:
    No. 16 grit, 3 pieces on left ½ of plank—5 pieces on right ½ of plank
    No. 10 grit, 3 pieces—randomly across
Scoring element No. 6:
    No. 10 grit, sparse all over
    No. 8 grit, 15 to 20 pieces—randomly.

(References on following page)

References Cited

UNITED STATES PATENTS

| | | | |
|---|---|---|---|
| 2,430,710 | 11/1947 | Dunlap | 51—326 X |
| 2,467,194 | 4/1949 | De Witt | 144—155 |
| 2,720,061 | 10/1955 | Anderson | 51—141 |
| 2,870,806 | 1/1959 | Thompson | 144—136 |
| 2,940,489 | 6/1960 | Feiner | 144—136 |
| 2,968,326 | 1/1961 | Myers | 144—136 |
| 3,181,279 | 5/1965 | Bauer et al. | 51—281 X |
| 3,214,870 | 11/1965 | Elmendorf | 51—281 |
| 3,393,294 | 7/1968 | Cramer | 144—328 X |

FOREIGN PATENTS

| | | | |
|---|---|---|---|
| 741,599 | 8/1966 | Canada | 144—328 |

LESTER M. SWINGLE, Primary Examiner

U.S. Cl. X.R.

51—139, 281, 323, 326; 144—136 R, 328